(12) United States Patent
Li

(10) Patent No.: US 10,827,113 B2
(45) Date of Patent: Nov. 3, 2020

(54) PHASE-DETECTION AUTO FOCUS METHOD AND DEVICE THEREFOR

(71) Applicant: ZTE CORPORATION, Guangdong (CN)

(72) Inventor: Liguo Li, Guangdong (CN)

(73) Assignee: ZTE CORPORATION

(*) Notice: Subject to any disclaimer, the term of this patent is extended or adjusted under 35 U.S.C. 154(b) by 0 days.

(21) Appl. No.: 16/478,323

(22) PCT Filed: Jun. 21, 2017

(86) PCT No.: PCT/CN2017/089365
§ 371 (c)(1),
(2) Date: Jul. 16, 2019

(87) PCT Pub. No.: WO2018/133322
PCT Pub. Date: Jul. 26, 2018

(65) Prior Publication Data
US 2020/0007778 A1 Jan. 2, 2020

(30) Foreign Application Priority Data
Jan. 17, 2017 (CN) .......................... 2017 1 0034871

(51) Int. Cl.
*H04N 5/232* (2006.01)

(52) U.S. Cl.
CPC ... *H04N 5/232122* (2018.08); *H04N 5/23209* (2013.01)

(58) Field of Classification Search
CPC ......... H04N 5/232122; H04N 5/23209; H04N 5/232; H04N 5/23212; G02B 7/28; G03B 13/36
See application file for complete search history.

(56) References Cited

U.S. PATENT DOCUMENTS

| 2015/0281556 A1* | 10/2015 | Hamano | H04N 5/23212 348/353 |
| 2016/0088218 A1* | 3/2016 | Kikuchi | H04N 5/23212 348/231.6 |
| 2016/0156836 A1* | 6/2016 | Aoki | H04N 5/23293 348/345 |

FOREIGN PATENT DOCUMENTS

| CN | 101750847 | 6/2010 |
| CN | 103048846 | 4/2013 |
| CN | 105308489 A | 2/2016 |
| CN | 105391934 | 3/2016 |

(Continued)

OTHER PUBLICATIONS

Patent Cooperation Treaty (PCT), International Search Report and Written Opinion for Application PCT/CN2017/089365 filed Jun. 21, 2017, dated Sep. 28, 2017, International Searching Authority, CN.

*Primary Examiner* — Gevell V Selby
(74) *Attorney, Agent, or Firm* — McDonald Hopkins LLC

(57) ABSTRACT

A phase-detection auto focus method includes: dividing a focus region into a plurality of sub-regions, and respectively calculating a phase difference and a confidence level of each sub-region; performing dynamic matching in a corresponding weight table according to the phase difference and the confidence level of each sub-region, and performing a table lookup to obtain a corresponding weight value; calculating a phase difference and a confidence level of the focus region in conjunction with the weight value; and performing auto focusing according to the phase difference and the confidence level of the focus region.

11 Claims, 4 Drawing Sheets

(56) References Cited

FOREIGN PATENT DOCUMENTS

CN 105474064 4/2016
WO 2016140066 9/2016

* cited by examiner

PHASE-DETECTION AUTO FOCUS METHOD AND DEVICE THEREFOR

CROSS-REFERENCE TO RELATED APPLICATION

This application is a 35 U.S.C. 371 national stage filing of PCT Application No. PCT/CN2017/089365 filed on Jun. 21, 2017, which claims priority to Chinese Patent Application No. 201710034871.9, filed on Jan. 17, 2017, each of which are incorporated herein in their entirety by reference.

TECHNICAL FIELD

The present application relates to, but is not limited to, the field of image processing and, in particular, relates to a phase-detection auto focus method and device therefor.

BACKGROUND

With the popularity of smartphones, consumers have more opportunities to take photos using smartphones, and expect to obtain photos with higher quality. Focus is a crucial link in the camera photographing process. Faster focusing speed and higher focus precision may better improve user experience and product competitiveness.

In the related art, an auto focus method of an electronic device includes phase detection auto focus and contrast detection auto focus, and the stroke shortening speed of the phase detection auto focus is faster than that of the contrast detection auto focus. In the related art, the principle of the phase detection auto focus is to reserve some shading pixels on the photosensitive element, which are specially used for phase detection, and determine a focus offset value according to the distance between pixels and the change thereof, thereby achieving the accurate focus. For example, in the related art, an image sensor acquires an original image signal and a blocking image signal after a blocking device is disposed in an imaging optical path, the image signals are sent to a focus processing unit, the focus processing unit processes the received image signals (the original image signal and the blocking image signal or different blocking image signals) to obtain a relative position relationship between the image sensor and an imaging plane, then it is determined whether the image is focused according to the relative position of the image sensor and the imaging plane, and the offset-focus image is focused by moving a lens group. In this method, the rapid phase detection auto focus in any position of the whole image may be achieved only by adding a simple blocking device in the imaging optical path.

SUMMARY

A summary of the subject matter is described hereinafter in detail. This summary is not intended to limit the scope of the claims.

The present disclosure provides a phase-detection auto focus method, which may reduce focus time and improve the focus precision.

An embodiment of the present disclosure provides a phase-detection auto focus method. The method includes:
dividing a focus region into a plurality of sub-regions, and respectively calculating a phase difference and a confidence level of each of the plurality of sub-regions;
performing dynamic matching in a corresponding weight table according to the phase difference and the confidence level of the each sub-region, and performing a table lookup to obtain a corresponding weight value;
calculating a phase difference and a confidence level of the focus region in conjunction with the weight value; and
performing auto focus according to the phase difference and the confidence level of the focus region.

In an exemplary embodiment, the performing dynamic matching in the corresponding weight table according to the phase difference and the confidence level of the each sub-region, and performing a table lookup to obtain the corresponding weight value includes:
performing a one-dimensional table lookup in a pre-stored correspondence table of confidence levels and weight values according to the confidence level of the each sub-region to respectively obtain a first weight value corresponding to the each sub-region; and
performing a two-dimensional table lookup in a pre-stored correspondence table of depths of field and weight values according to the phase difference of the each sub-region to respectively obtain a second weight value corresponding to the each sub-region.

In an exemplary embodiment, the step of calculating a phase difference and a confidence level of the focus region in conjunction with the weight value includes:
performing weighted summation on the phase difference and the confidence level of the each sub-region according to the second weight value and the first weight value to obtain the phase difference and the confidence level of the focus region.

In an exemplary embodiment, the performing a two-dimensional table lookup in a pre-stored correspondence table of depths of field and weight values according to the phase difference of the each sub-region to respectively obtain a second weight value corresponding to the each sub-region includes:
calculating an absolute difference corresponding to the phase difference of the each sub-region according to the phase difference of the each sub-region, determining whether the absolute difference corresponding to the each sub-region is greater than a preset depth of field threshold, and in condition that the absolute difference corresponding to the sub-region is greater than the preset depth of field threshold, determining that the depth of field of the sub-region is different from depths of field of other sub-regions in the focus region, matching a correspondence table of depths of field and weights according to the depth of field of the each sub-region, and performing the two-dimensional table lookup in the correspondence table of depths of field and weights to obtain the second weight value corresponding to the each sub-region; and
in condition that the absolute difference corresponding to the sub-region is less than or equal to the preset depth of field threshold, determining that the depth of field of the sub-region is a same as the depth of field of the other sub-regions in the focus region, automatically matching a preset default weight table, and performing the two-dimensional table look-up in the default weight table to obtain the second weight value corresponding to the sub-region.

In an exemplary embodiment, in second weight values respectively corresponding to the plurality of sub-regions obtained through the two-dimensional table lookup, a second weight value corresponding to a sub-region in a center of the focus region is greater than a second weight value corresponding to a sub-region around the sub-region in the center of the focus region.

An embodiment of the present disclosure further provides a phase-detection auto focus device. The device includes a data processing module, a matching module and a controlling module.

The data processing module is configured to divide a focus region into a plurality of sub-regions, and respectively calculate a phase difference and a confidence level of each of the plurality of sub-regions.

The matching module is configured to perform dynamic matching in a corresponding weight table according to the phase difference and the confidence level of the each sub-region, and perform a table lookup to obtain a corresponding weight value.

The controlling module is configured to calculate a phase difference and a confidence level of the focus region in conjunction with the weight value, and control auto focus according to the phase difference and the confidence level of the focus region.

In an exemplary embodiment, the matching module includes a database, a first matching submodule and a second matching submodule.

The database is configured to pre-store a correspondence table of confidence levels and weight values and a correspondence table of depths of field and weight values.

The first matching submodule is configured to perform a one-dimensional table lookup in the pre-stored correspondence table of confidence levels and weight values according to the confidence level of the each sub-region to respectively obtain a first weight value corresponding to the each sub-region.

The second matching submodule is configured to perform a two-dimensional table lookup in the pre-stored correspondence table of depths of field and weight values according to the phase difference of the each sub-region to respectively obtain a second weight value corresponding to the each sub-region.

In an exemplary embodiment, the second matching submodule includes a depth-of-field determining unit and a weight matching unit.

The depth-of-field determining unit is configured to determine whether depths of field of the plurality of sub-regions are the same according to the phase difference of the each sub-region.

The weight matching unit is configured to: in response to determining by the depth-of-field determining unit that depths of field of the plurality of sub-regions are different, match a corresponding correspondence table of depths of field and weight values according to the depth of field corresponding to the each sub-region, and perform the two-dimensional table lookup in the correspondence table of depths of field and weight values to obtain the second weight value corresponding to the each sub-region, where a second weight value corresponding to a sub-region in a center of the focus region is greater than a second weight value corresponding to a sub-region around the sub-region in the center of the focus region; and in response to determining by the depth-of-field determining unit that depths of field of the plurality of sub-regions are the same, automatically match a preset default weight table, and perform the two-dimensional table look-up in the default weight table to obtain the second weight value corresponding to the each sub-region.

In an exemplary embodiment, the controlling module includes a calculating submodule and a focusing submodule.

The calculating submodule is configured to perform weighted summation on the phase difference and the confidence level of the each sub-region according to the second weight value and the first weight value to obtain the phase difference and the confidence level of the focus region.

The focusing submodule is configured to control a motor to automatically focus according to the phase difference and the confidence level of the focus area calculated by the calculating submodule.

In an exemplary embodiment, the depth-of-field determining unit includes an absolute value calculating subunit and a comparing subunit.

The absolute value calculating subunit is configured to calculate an absolute difference corresponding to the phase difference of the each sub-region according to the phase difference of the each sub-region.

The comparing subunit is configured to: compare the absolute difference and a preset depth of field threshold and determine whether the absolute difference is greater than the preset depth of field threshold, and in condition that at least one absolute difference is greater than the preset depth of field threshold, determine that depths of field of the plurality of sub-regions are different; and in condition that the absolute difference value is less than or equal to the preset depth threshold, determine that sub-regions with different depths of field do not exist.

An embodiment of the present disclosure further provides a computer-readable storage medium, stored programs which, when executed, perform the phase-detection auto focus method described above.

The embodiments of the present disclosure have following advantageous effects.

The embodiments of the present disclosure divide a focus region into a plurality of sub-regions, and respectively calculate a phase difference and a confidence level of each sub-region; perform dynamic matching in a corresponding weight table according to the phase difference and the confidence level of the each sub-region, and perform a table lookup to obtain a corresponding weight value; calculate a phase difference and a confidence level of the focus region in conjunction with the weight value; and perform auto focus according to the phase difference and the confidence level of the focus region, thereby effectively utilizing information with a high confidence level, improving the focus precision and reducing the focus time.

Other aspects can be understood after the drawings and detailed description are read and understood.

DETAILED DESCRIPTION

Embodiments of the present disclosure will be described below in conjunction with the drawings. It should be noted that if not in collision, the embodiments described herein and the various methods therein may be combined with each other.

It should be noted that the terms "first", "second" and the like described herein are used to distinguish between similar objects and are not necessarily used to describe a particular order or sequence.

In the related art, since the phase detection needs to be performed by using the shading pixels on the complementary metal oxide semiconductor (CMOS), the phase detection auto focus has higher requirements on the light intensity, and all the pixels with PD information are easily affected by noise and focus pictures. Therefore, the phase value calculated through the phase detection auto focus method in the related art is inaccurate, which prolongs the focus time and reduces the focus precision.

The embodiments of the present disclosure divide a focus region into a plurality of sub-regions, and respectively calculate a phase difference and a confidence level of each sub-region; perform dynamic matching in a corresponding weight table according to the phase difference and the confidence level of each sub-region, and perform a table lookup to obtain a corresponding weight value; calculate a phase difference and a confidence level of the focus region in conjunction with the weight value; and perform auto focus according to the phase difference and the confidence level of the focus region, thereby effectively utilizing information with a high confidence level, improving the focus precision and reducing the focus time.

Figure 1:
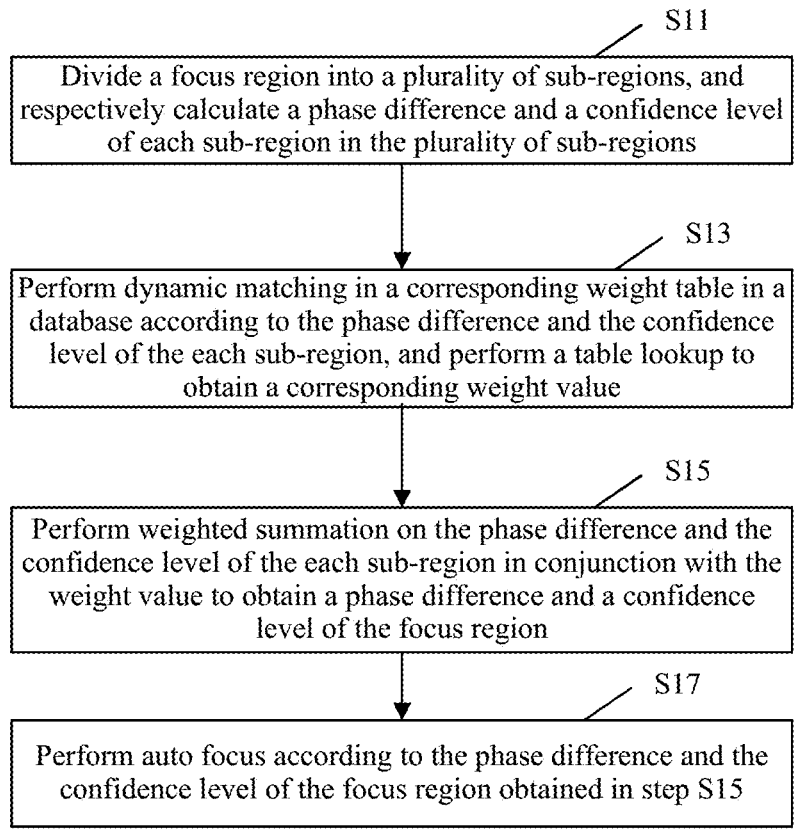
FIG. 1 is a flowchart of a phase-detection auto focus method according to an embodiment of the present disclosure.

FIG. 1 is a flowchart of a phase-detection auto focus method according to an embodiment of the present disclosure. Referring to FIG. 1, the phase-detection auto focus method includes steps S11, S13, S15 and S17.

In step S11, a focus region is divided into multiple sub-regions, and a phase difference and a confidence level of each sub-region in the multiple sub-regions are respectively calculated.

In this embodiment, a view may be found through a capturing module of a terminal device in advance, a preview image is displayed on a display screen, and meanwhile, an image may be acquired through an image sensor. Optionally, the image sensor may be a sensor using a phase detection auto focus (PDAF) technology, which is abbreviated as a PD sensor. The focus region may refer to a region to be processed of interest selected from the acquired image to be processed.

Figure 4:
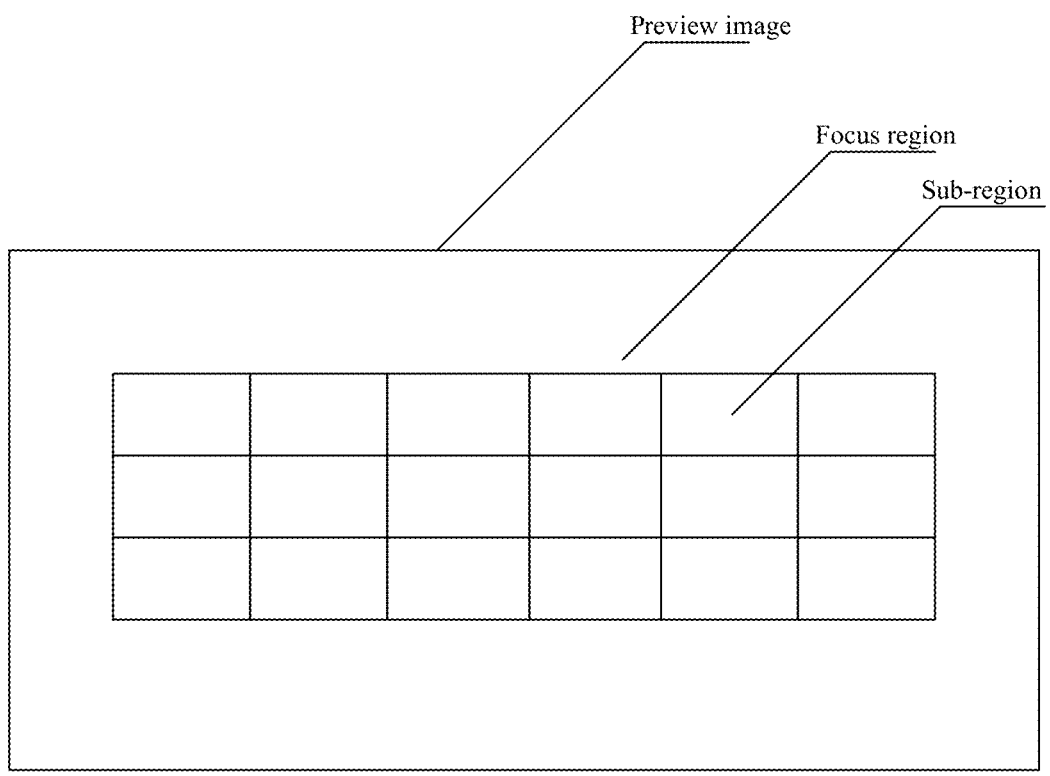
FIG. 4 is a schematic diagram illustrating that a focus region is divided into multiple sub-regions.

In this embodiment, the confidence level may refer to a value of the PD confidence level outputted by the PD sensor, which represents the confidence level of the PD value (i.e., the phase difference value). The larger the value of the PD confidence level is, the higher the confidence level of the PD value is. Based on this, in this embodiment, the focus region may be divided into multiple sub-regions (referring to FIG. 4), and then the effectiveness of each of the multiple sub-regions may be determined through the confidence level of each sub-region, so that focus may be performed according to the confidence level of each sub-region. Optionally, in this embodiment, after the device is opened to extract preview picture information, that is, the focus region needs to be divided into M*N sub-regions, $Region_{0,0}$, $Region_{0,1}$, $Region_{0,2}$, . . . , and $Region_{M-1,N-1}$, the phase difference, Defocus. $Region_{0,0}$, Defocus. $Region_{0,1}$, Defocus. $Region_{0,2}$, . . . , and Defocus. $Region_{M-1,N-1}$, and the confidence level, Confidence. $Region_{0,0}$, Confidence. $Region_{0,1}$, Confidence. $Region_{0,2}$, . . . , and Confidence. $Region_{M-1,N-1}$, of each sub-region are calculated respectively.

Figure 2:
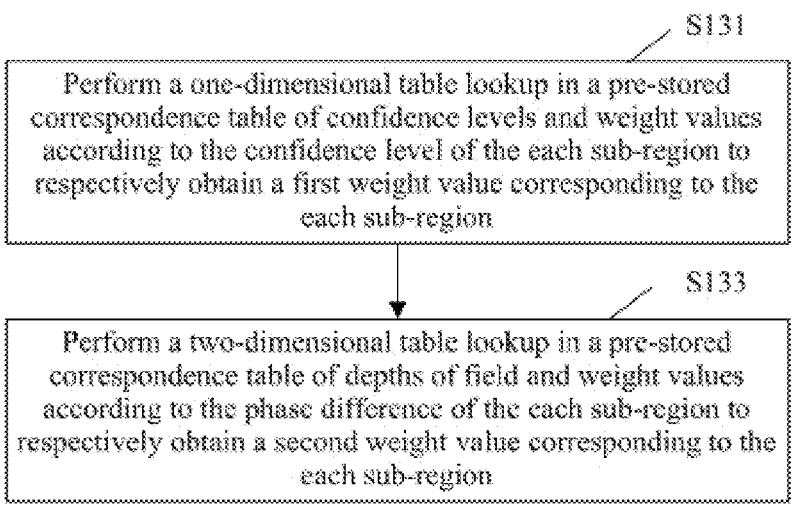
FIG. 2 is a flowchart of an optional embodiment of step S13 in FIG. 1.

In step S13, dynamic matching is performed in a corresponding weight table in a database according to the phase difference and the confidence level of each sub-region, and a table lookup is performed to obtain a corresponding weight value. In this embodiment, referring to FIG. 2, the step S13 may include steps described below.

In step S131, a one-dimensional table lookup is performed in a pre-stored correspondence table of confidence levels and weight values according to the confidence level of each sub-region to respectively obtain a first weight value corresponding to each sub-region.

In this embodiment, the corresponding weight table may be pre-stored in the database, such as a correspondence table of confidence levels and weight values, a correspondence table of depths of field and weight values and the like. After the confidence level and the phase difference of each sub-region are calculated, a corresponding correspondence table of confidence levels and weight values may be matched in the database, and then weight values, $Ratio_{0,0}$, $Ratio_{0,1}$, $Ratio_{0,2}$, . . . , and $Ratio_{M-1,N-1}$, corresponding to confidence levels of different sub-regions may be searched in the correspondence table of confidence levels and weight values according to the confidence level of each sub-region, so as to obtain the first weight value corresponding to each sub-region. Optionally, when the confidence level, confidence, of a current sub-region meets a following condition: $confidence_1 < confidence \leq confidence_2$ (where $confidence_1$ and $confidence_2$ are respectively a minimum value and a maximum value of preset confidence level subranges in the correspondence table, and each confidence level subrange corresponds to a weight value), the corresponding weight value is $Ration_1$ while when the confidence meets a following condition: $confidence_2 < confidence < confidence_3$, the corresponding weight value is $Ration_2$, and so on until the whole confidence level rang is covered.

In step S133, a two-dimensional table lookup is performed in a pre-stored correspondence table of depths of field and weight values according to the phase difference of each sub-region to respectively obtain a second weight value corresponding to each sub-region.

In this embodiment, the step S133 may include steps described. It is determined whether depths of field of multiple sub-regions are the same according to the depth of field of each sub-region; in condition that depths of field of multiple sub-regions are different, a corresponding correspondence table of depths of field and weight values is matched according to the depth of field of each sub-region, and the two-dimensional table lookup is performed in the correspondence table of depths of field and weight values to obtain the second weight value corresponding to each sub-region, where a second weight value corresponding to a sub-region in the center of the focus region is greater than a second weight value corresponding to a sub-region around the sub-region in the center of the focus region; and in condition that depths of field of multiple sub-regions are the same, a preset default weight table is automatically matched, and the two-dimensional table look-up is performed in the default weight table to obtain the second weight value corresponding to each sub-region.

On an optional embodiment, it is determined whether depths of field of multiple sub-regions are the same by comparing an absolute difference of the phase difference of each sub-region with a preset depth of field threshold. If the absolute difference corresponding to at least one sub-region is greater than the preset depth of field threshold, it is determined that depths of field of multiple sub-regions are different, and the second weight value corresponding to the sub-region in the center of the focus region may be increased. As shown in Table 3, weight values of the darkened portion in the center are greater than weight values of the periphery portion. If the absolute difference corresponding to each sub-region is less than the preset depth threshold, it is determined that depths of field of multiple sub-regions are the same, and all the second weight values may be 1.

In step S15, weighted summation is performed on the phase difference and the confidence level of each sub-region in conjunction with the first weight value and the second weight value obtained in above steps S131 and S133 to obtain the phase difference and the confidence level of the focus region.

In step S15, the weighted summation may be performed on the confidence level of each sub-region according to the first weight value of each sub-region to obtain the confidence level of the focus region; and the weighted summation may be performed on the phase difference of each sub-region according to the second weight value of each sub-region to obtain the phase difference of the focus region.

In step S17, auto focus is performed according to the phase difference and the confidence level of the focus region obtained in step S15.

This embodiment may divide the focus region into M*N sub-regions, and respectively calculate the phase difference and the confidence level of each sub-region, perform the table lookup in the weight table pre-stored in the database according to the phase difference and the confidence level to obtain the corresponding weight value, perform the weighted summation to obtain the confidence level and the phase difference of the focus region, and drive the motor to a focus point according to the confidence level and the phase difference of the focus region; and may also adjust the corresponding weight value according to the absolute value of the phase difference of each sub-region, thereby effectively utilizing information with a high confidence level, improving the focus precision and reducing the focus time.

Embodiment 2

Figure 3:
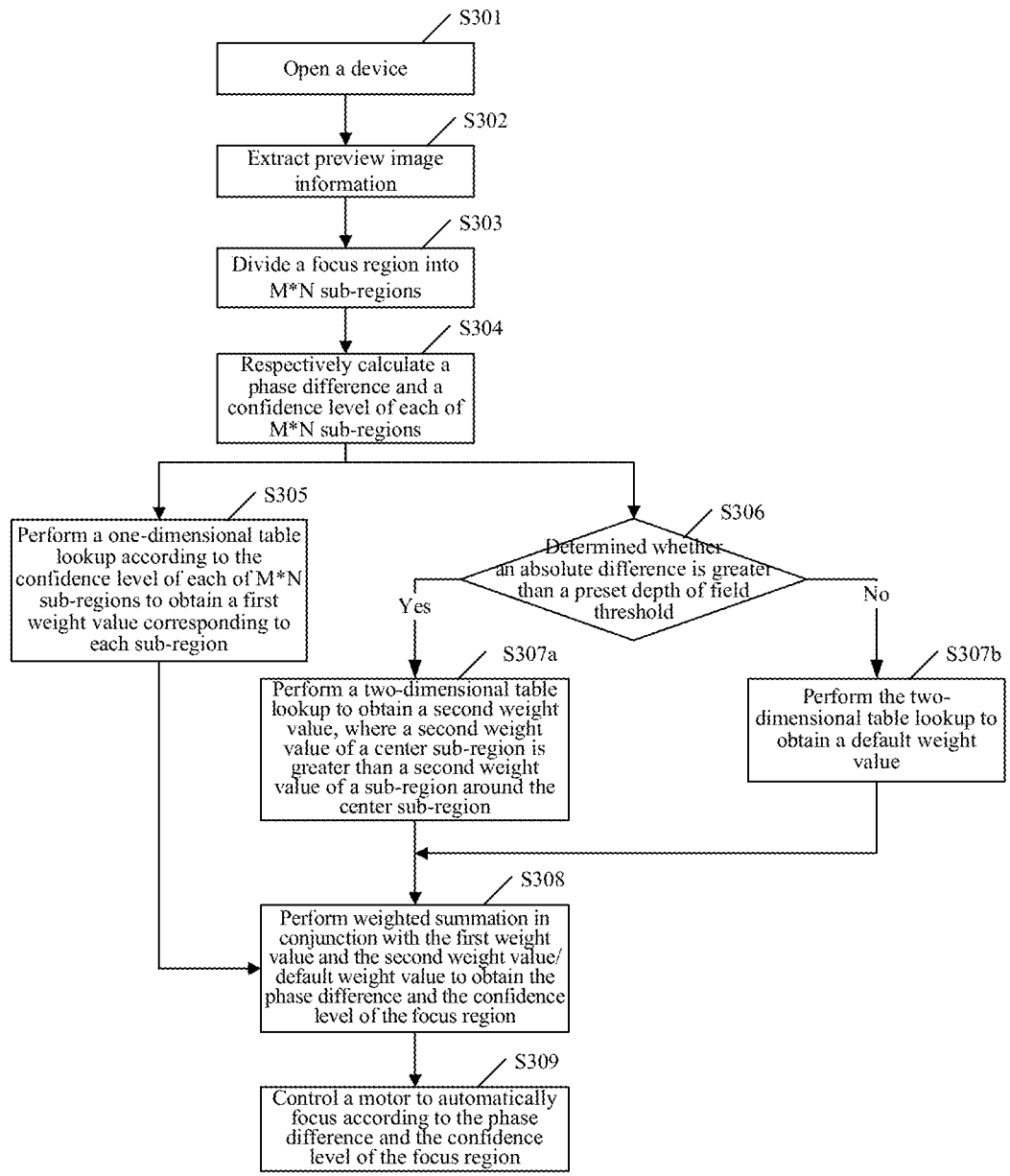
FIG. 3 is a flowchart of an optional embodiment corresponding to the phase-detection auto focus method in FIG. 1.

FIG. 3 is a flowchart of a phase-detection auto focus method according to an optional embodiment of the present disclosure. Referring to FIG. 3, in this embodiment, the phase-detection auto focus method may include steps described below.

In step S301, a device is turned on. In an optional embodiment, the device may be an electronic terminal device such as a smartphone or a camera which can take photos, the electronic terminal device may be further provided with a PD sensor, which may acquire an image through an image sensor, and the image may be an image previewed on a display screen after the camera or a capturing module on the electronic terminal device is opened.

In step S302, preview image information is extracted.

In step S303, a focus region in the preview image is divided into M*N sub-regions, $Region_{0,0}$, $Region_{0,1}$, $Region_{0,2}$, ..., and $Region_{M-1,N-1}$.

In step S304, a phase difference and a confidence level of each of M*N sub-regions are respectively calculated.

In this embodiment, after the focus region is divided into M*N sub-regions, the phase difference and the confidence level corresponding to each of M*N sub-regions may be respectively calculated. For example, a phase difference corresponding to the sub-region, $Region_{0,0}$, is Defocus. $Region_{0,0}$, and its confidence level is Confidence. $Region_{0,0}$; a phase difference corresponding to the sub-region, $Region_{0,1}$, is Defocus. $Region_{0,1}$, and its confidence level is Confidence. $Region_{0,1}$; ... ; and a phase difference corresponding to the sub-region, $Region_{M-1,N-1}$, is Defocus. $Region_{M-1,N-1}$, and its confidence level is Confidence. $Region_{M-1,N-1}$, which is shown in Table 1.

In this embodiment, the confidence level may refer to a value of a PD confidence level output by the PD sensor, i.e., a confidence representing the PD value confidence magnitude. The larger the value of the PD confidence level is, the higher the confidence level of the PD value is. That is, effectiveness of each sub-region may be determined through the confidence level. When this PD value is effective, the auto focus may be performed according this PD value.

TABLE 1 phase difference and confidence level corresponding to each of M * N sub-regions

| | | | |
|---|---|---|---|
| Defocus. $Region_{0,0}$ Confidence. $Region_{0,0}$ | Defocus. $Region_{0,1}$ Confidence. $Region_{0,1}$ | ... | Defocus. $Region_{0,N-1}$ Confidence. $Region_{0,N-1}$ |
| Defocus. $Region_{1,0}$ Confidence. $Region_{1,0}$ | ... | | ... ... |
| ... | ... | | ... ... |
| Defocus. $Region_{M-1,0}$ Confidence. $Region_{M-1,0}$ | ... | | Defocus. $Region_{M-1,N-1}$ Confidence. $Region_{M-1,N-1}$ |

In step S305, a correspondence table of confidence levels and weight values in a database is matched, and a one-dimensional table lookup is performed in the correspondence table of confidence levels and weight values according to the confidence level of each of M*N sub-regions to obtain a first weight value corresponding to each of M*N sub-regions.

Optionally, in this embodiment, a correspondence table of confidence levels and weight values may be constructed in advance, such as Table 2. Each weight value corresponds to a confidence level sub-range. For example, $Ratio_1$ corresponds to a confidence level sub-range [$confidence_1$, $confidence_2$]. When the calculated confidence level of the current sub-region, $confidence_{i,j}$ (where $0 \leq i \leq M-1$, $0 \leq n \leq N-1$, and M and N are integers) meets a following condition: $confidence_1 < confidence_{i,j} < confidence_2$, the corresponding weight value is $Ratio_{i,j}$ (where $0 \leq i \leq M-1$, $0 \leq n \leq N-1$, and M and N are integers)$=Ration_1$, and so on until the whole confidence level range is covered, so as to respectively obtain the first weight value of the $defocus_{i,j}$ and the $confidence_{i,j}$ in each of M*N sub-regions, $Ratio_{0,0}$, $Ratio_{0,0}$, . . . , and $Ratio_{M-1,N-1}$.

TABLE 2 correspondence table of confidence levels and weight values

| | |
|---|---|
| $Confidence_0$<confidence< = $confidence_1$ | $Ratio_0$ |
| $Confidence_1$<confidence< = $confidence_2$ | $Ratio_1$ |
| ... | ... |
| ... | ... |
| $Confidence_{n-2}$<confidence< = $confidence_{n-1}$ | $Ratio_{n-1}$ |

In step S306, it is determined whether an absolute difference of each sub-region is greater than a preset depth of field threshold; if yes, go to step S307a; if no, go to step S307b.

In this embodiment, it may be determined whether objects with different depths of field exist in the focus region. Optionally, the absolute difference of the phase difference of each of M*N sub-regions may be compared with the preset depth of field threshold. If the absolute difference corresponding to the phase difference of the current sub-region is greater than the preset threshold, it is determined that objects with different depths of field exist in the focus region. That is, the depth of field of the current sub-region is different from depths of field of other sub-regions. At this point, the step S307a is executed. That is, a corresponding correspondence table of depths of field and weight values is matched according to different depths of field (or absolute differences), and a table lookup is performed to obtain a corresponding second weight value. If the absolute difference corresponding to the phase difference of each of M*N sub-regions is less than or equal to the preset depth of field threshold, the step S307b is executed. That is, a default weight table is selected, and the table lookup is performed to obtain a weight value corresponding to each sub-region. For example, the weight value may be a default weight value 1.

In step S307a, a two-dimensional table lookup is performed according to the absolute difference to obtain a second weight value corresponding to each sub-region.

In this embodiment, since objects with different depths of field exist in the focus region, a depth of field of a sub-region in the center of the focus region is larger than a depth of field of a sub-region around the sub-region in the center, optionally, a second weight value obtained through the table lookup corresponding to the sub-region in the center of the focus region is greater than a second weight value corresponding to the sub-region around the sub-region in the center of the focus region. As shown in Table 3, weight values of the darkened portion in the center are greater than weight values of the periphery portion.

TABLE 3 second weight value corresponding to each of M * N sub-regions

| $Ratio'_{0,0}$ | $Ratio'_{0,0}$ | ... | ... | $Ratio'_{0,0}$ | $Ratio'_{0,0}$ |
|---|---|---|---|---|---|
| ... | ... | $Ratio'_{a,b}$ | $Ratio'_{a,b+1}$ | ... | ... |
| ... | ... | $Ratio'_{a+1,b}$ | $Ratio'_{a+1,b+1}$ | ... | ... |
| $Ratio'_{0,0}$ | $Ratio'_{0,0}$ | ... | ... | $Ratio'_{0,0}$ | $Ratio'_{0,0}$ |

In step S30b, a default weight table is matched, and the weight value corresponding to each of M*N sub-regions is a default weight value 1.

In step S308, weighted summation is performed in conjunction with the first weight value and the second weight value/default weight value to obtain the phase difference and the confidence level of the focus region.

Optionally, in this embodiment, when sub-regions with different depths of field exist in the focus region, the phase difference and the confidence level of the focus region are respectively Defocus and Confidence shown below.

$Defocus=Defocus.Region_{0,0}*Ratio_{0,0}*Ratio_{0,0}'+Defocus.Region_{0,1}*Ratio_{0,1}*Ratio_{0,1}'+Defocus.Region_{0,2}*Ratio_{0,2}*Ratio_{0,2}' \ldots +Defocus.Region_{M-1,N-1}*Ratio_{M-1,N-1}*Ratio_{M-1,N-1}'$ $Confidence=Confidence.Region_{0,0}*Ratio_{0,0}*Ratio_{0,0}'+Confidence.Region_{0,1}*Ratio_{0,1}*Ratio_{0,1}'+Confidence.Region_{0,2}*Ratio_{0,2}*Ratio_{0,2}'+Confidence.Region_{M-1,N-1}*Ratio_{M-1,N-1}*Ratio_{M-1,N-1}'$ Optionally, in this embodiment, when the depth of field of each sub-region in the focus region is the same, the phase difference and the confidence level of the focus region are respectively Defocus and Confidence shown below.

$Defocus=Defocus.Region_{0,0}*Ratio_{0,0}*1+Defocus.Region_{0,1}*Ratio_{0,1}*1+Defocus.Region_{0,2}*Ratio_{0,2}*1+Defocus.Region_{M-1,N-1}*Ratio_{M-1,N-1}*1$ $Confidence=Confidence.Region_{0,0}*Ratio_{0,0}*1+Confidence.Region_{0,1}*Ratio_{0,1}*1+Confidence.Region_{0,2}*Ratio_{0,2}*1+Confidence.Region_{M-1,N-1}*Ratio_{M-1,N-1}*1$ In step S309, a motor is controlled to perform auto focus according to the phase difference, Defocus, and the confidence level, Confidence, of the focus region.

In this embodiment, the focus region is divided into M*N sub-regions, the phase difference and the confidence level of each sub-region are respectively calculated, the corresponding second weight value and the first weight value are obtained from the weight table pre-stored in the database according to the phase difference and the confidence level, the weighted summation is performed to obtain the phase difference and the confidence level of the focus region, the motor is driven to a focus point according to the phase difference and the confidence level of the focus region, and the corresponding weight value is also adjusted according to the absolute value of the phase difference, thereby effectively utilizing information with a high confidence level, improving the focus precision and reducing the focus time.

Embodiment 3

Corresponding to the phase detection auto focus method described above, an embodiment of the present disclosure further provides a phase detection auto focus device. A detailed description is given below in conjunction with embodiments and drawings.

Figure 5:
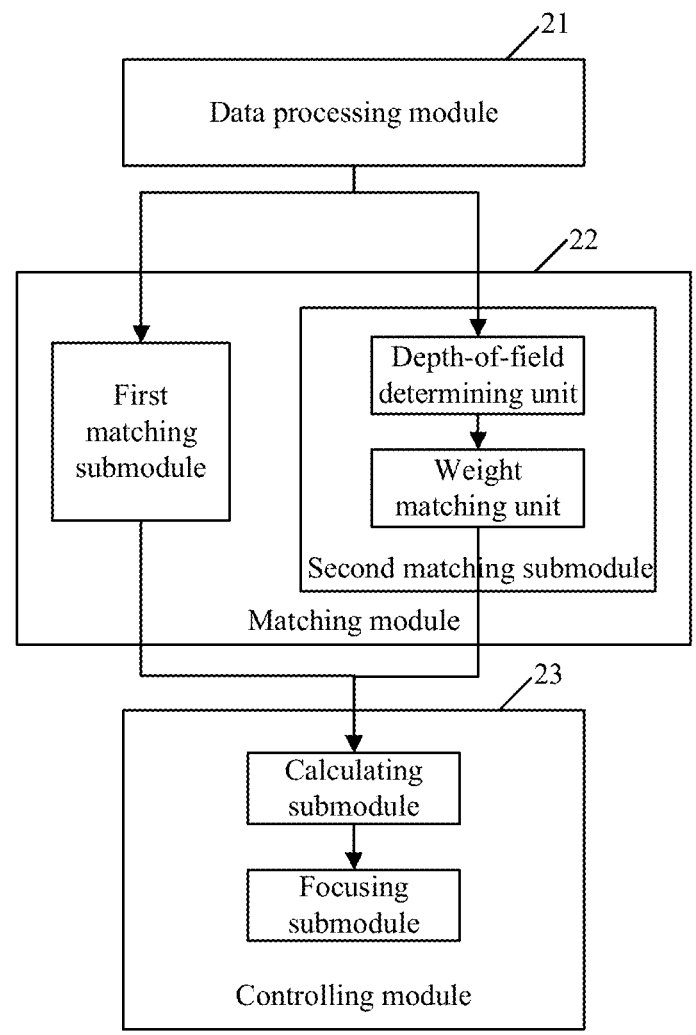
FIG. 5 is a functional module diagram of a phase-detection auto focus device according to an embodiment of the present disclosure.

FIG. 5 is a functional module diagram of a phase-detection auto focus device according to an embodiment of the present disclosure. Referring to FIG. 5, in this embodiment, the phase-detection auto focus device includes a data processing module 21, a matching module 22 and a controlling module 23.

The data processing module 21 is configured to divide a focus region into multiple sub-regions, and respectively calculate a phase difference and a confidence level of each sub-region. In this embodiment, the focus region may refer to a region to be processed selected from an image to be processed. In the implementation, the data processing module 21 may first acquire focus region information from a terminal device, then divide the focus region into M*N sub-regions, and respectively calculate a phase difference and a confidence level of each sub-region in conjunction with a PD sensor.

The matching module 22 is configured to perform dynamic matching in a corresponding weight table according to the phase difference and the confidence level of each sub-region, and perform a table lookup to obtain a corresponding weight value. The matching module 22 may include a first matching submodule and a second matching submodule. The first matching submodule is configured to perform a one-dimensional table lookup in a pre-stored correspondence table of confidence levels and weight values according to the confidence level of each sub-region to respectively obtain a first weight value corresponding to each sub-region. The second matching submodule is configured to perform a two-dimensional table lookup in a pre-stored correspondence table of depths of field and weight values according to the phase difference of each sub-region to respectively obtain a second weight value corresponding to each sub-region.

In an optional embodiment, the second matching submodule may include a depth-of-field determining unit and a weight matching unit. The depth-of-field determining unit is configured to determine whether depths of field of multiple sub-regions in the focus region are the same according to the phase difference of each sub-region. Optionally, the depth-of-field determining unit may include an absolute value calculating subunit and a comparing subunit. The absolute value calculating subunit is configured to calculate an absolute difference corresponding to the phase difference of each sub-region according to the phase difference of each sub-region. The comparing subunit is configured to compare the absolute difference and a preset depth of field threshold and determine whether the absolute difference is greater than the preset depth of field threshold, and if at least one absolute difference is greater than the preset depth of field threshold, determine that depths of field of multiple sub-regions are different; and if the absolute difference value corresponding to the phase difference of each sub-region is less than or equal to the preset depth threshold, determine that sub-regions with different depths of field do not exist. The weight matching unit is configured to when the depth-of-field determining unit determines that depths of field of multiple sub-regions are different, match a corresponding correspondence table of depths of field and weight values according to the depth of field corresponding to each sub-region, and perform the two-dimensional table lookup in the correspondence table of depths of field and weight values to obtain the second weight value corresponding to each sub-region, where a second weight value corresponding to a sub-region in the center of the focus region is greater than a second weight value corresponding to a sub-region around the sub-region in the center of the focus region; and when the depth-of-field determining unit determines that depths of field of multiple sub-regions are the same, automatically match a preset default weight table, and perform the two-dimensional table look-up in the default weight table to obtain the second weight value corresponding to each sub-region.

The controlling module 23 is configured to calculate a phase difference and a confidence level of the focus region in conjunction with the weight value obtained by the matching module 22, and control a motor to automatically focus according to the phase difference and the confidence level of the focus region. Optionally, the controlling module 23 may include a calculating submodule and a focusing submodule. The calculating submodule is configured to perform weighted summation on the phase difference and the confidence level of each sub-region according to the second weight value and the first weight value to obtain the phase difference and the confidence level of the focus region. The focusing submodule is configured to control the motor to automatically focus according to the phase difference and the confidence level of the focus area calculated by the calculating submodule.

The auto focus principle of the phase detection auto focus device of this embodiment is the same as the auto focus principle of the above Embodiments 1 and 2, and the details are not repeated herein. That is, in this embodiment, the phase detection auto focus device divides the focus region into multiple sub-regions (such as M*N sub-regions), respectively calculates the phase difference and the confidence level of each sub-region, obtains the corresponding weight value from the weight table pre-stored in the database according to the phase difference and the confidence level, performs the weighted summation to obtain the phase difference and the confidence level of the focus region, drives the motor to a focus point according to the phase difference and the confidence level of the focus region, and adjusts the corresponding weight value according to the absolute value of the phase difference of each sub-region, thereby effectively utilizing information with a high confidence level, improving the focus precision and reducing the focus time.

An embodiment of the present disclosure further provides a computer-readable storage medium, which is configured to store computer-executable instructions for implementing the phase-detection auto focus method described above when the computer-executable instructions are executed.

It should be understood by those of ordinary skill in the art that all or part of the steps in the above-mentioned embodiments may be implemented by using one or more computer programs. The computer programs may be stored in a computer-readable storage medium and executed on a corresponding hardware platform (e.g., system, device, apparatus, component or processor). During the execution of these programs, one of or a combination of the steps in the above-mentioned method embodiments is implemented.

Optionally, all or part of the steps in the above-mentioned embodiments may also be implemented by using one or more integrated circuits. These steps may be made into integrated circuit modules separately, or part of these modules or steps may be made into a single integrated circuit module for implementation.

The apparatuses/functional modules/functional units in the above-mentioned embodiments may be implemented on a general-purpose computing apparatus. They may be concentrated on a single computing apparatus or distributed over a network composed of multiple computing apparatuses.

The apparatuses/functional modules/functional units in the above-mentioned embodiments are implemented by software functional modules, and can be stored in a computer-readable storage medium when sold or used as independent products. The above-mentioned computer-readable storage medium may be a read-only memory, a magnetic disk, an optical disk, or the like.

It should be understood by those of ordinary skill in the art that modifications or equivalent substitutions on the technical solutions of the present application may be made without departing from the spirit and scope of the technical solutions of the present application. The protection scope of the present application is defined by the appended claims.

What is claimed is:

1. A phase-detection auto focus method, comprising:
dividing a focus region into a plurality of sub-regions, and respectively calculating a phase difference and a confidence level of each sub-region in the plurality of sub-regions;
performing dynamic matching in a corresponding weight table according to the phase difference and the confidence level of the each sub-region, and performing a table lookup to obtain a corresponding weight value;
calculating a phase difference and a confidence level of the focus region in conjunction with the weight value; and
performing auto focus according to the phase difference and the confidence level of the focus region.

2. The phase-detection auto focus method of claim 1, wherein the performing dynamic matching in the corresponding weight table according to the phase difference and the confidence level of the each sub-region, and performing a table lookup to obtain the corresponding weight value comprises:
performing a one-dimensional table lookup in a pre-stored correspondence table of confidence levels and weight values according to the confidence level of the each sub-region to respectively obtain a first weight value corresponding to the each sub-region; and performing a two-dimensional table lookup in a pre-stored correspondence table of depths of field and weight values according to the phase difference of the each sub-region to respectively obtain a second weight value corresponding to the each sub-region.

3. The phase-detection auto focus method of claim 2, wherein the calculating the phase difference and the confidence level of the focus region in conjunction with the weight value comprises:

performing weighted summation on phase differences of the plurality of the sub-regions and performing weighted summation on confidence levels of the sub-regions according to the second weight value and the first weight value to obtain the phase difference and the confidence level of the focus region.

4. The phase-detection auto focus method of claim 2, wherein the performing a two-dimensional table lookup in the pre-stored correspondence table of depths of field and weight values according to the phase difference of the each sub-region to respectively obtain a second weight value corresponding to the each sub-region comprises:

calculating an absolute difference corresponding to the phase difference of the each sub-region according to the phase difference of the each sub-region, determining whether the absolute difference corresponding to the each sub-region is greater than a preset depth of field threshold, and in condition that the absolute difference corresponding to the sub-region is greater than the preset depth of field threshold, determining that the depth of field of the sub-region is different from depths of field of other sub-regions in the focus region, matching a correspondence table of depths of field and weights according to the depth of field of the each sub-region, and performing the two-dimensional table lookup in the correspondence table of depths of field and weights to obtain the second weight value corresponding to the each sub-region; and in condition that the absolute difference corresponding to the sub-region is less than or equal to the preset depth of field threshold, determining that the depth of field of the sub-region is same as the depth of field of the other sub-regions in the focus region, automatically matching a preset default weight table, and performing the two-dimensional table look-up in the default weight table to obtain the second weight value corresponding to the sub-region.

5. The phase-detection auto focus method of claim 4, wherein in second weight values respectively corresponding to the plurality of sub-regions obtained through the two-dimensional table lookup, a second weight value corresponding to a sub-region in a center of the focus region is greater than a second weight value corresponding to a sub-region around the sub-region in the center of the focus region.

6. A phase-detection auto focus device, comprising:
a data processing module, which is configured to divide a focus region into a plurality of sub-regions, and respectively calculate a phase difference and a confidence level of each sub-region in the plurality of sub-regions;
a matching module, which is configured to perform dynamic matching in a corresponding weight table according to the phase difference and the confidence level of the each sub-region, and perform a table lookup to obtain a corresponding weight value; and a controlling module, which is configured to calculate a phase difference and a confidence level of the focus region in conjunction with the weight value, and control auto focus according to the phase difference and the confidence level of the focus region.

7. The phase-detection auto focus device of claim 6, wherein the matching module comprises:
a database, which is configured to pre-store a correspondence table of confidence levels and weight values and a correspondence table of depths of field and weight values;
a first matching submodule, which is configured to perform a one-dimensional table lookup in the pre-stored correspondence table of confidence levels and weight values according to the confidence level of the each sub-region to respectively obtain a first weight value corresponding to the each sub-region; and
a second matching submodule, which is configured to perform a two-dimensional table lookup in the pre-stored correspondence table of depths of field and weight values according to the phase difference of the each sub-region to respectively obtain a second weight value corresponding to the each sub-region.

8. The phase-detection auto focus device of claim 7, wherein the second matching submodule comprises:
a depth-of-field determining unit, which is configured to determine whether depths of field of the plurality of sub-regions are a same according to the phase difference of the each sub-region; and
a weight matching unit, which is configured to: in response to determining by the depth-of-field determining unit that depths of field of the plurality of sub-regions are different, match a corresponding correspondence table of depths of field and weight values according to the depth of field corresponding to the each sub-region, and perform the two-dimensional table lookup in the correspondence table of depths of field and weight values to obtain the second weight value corresponding to the each sub-region, wherein a second weight value corresponding to a sub-region in a center of the focus region is greater than a second weight value corresponding to a sub-region around the sub-region in the center of the focus region; and in response to determining by the depth-of-field determining unit that depths of field of the plurality of sub-regions are the same, automatically match a preset default weight table, and perform the two-dimensional table look-up in the default weight table to obtain the second weight value corresponding to the each sub-region.

9. The phase-detection auto focus device of claim 7, wherein the controlling module comprises:
a calculating submodule, which is configured to perform weighted summation on phase differences of the plurality of the sub-regions and perform weighted summation on confidence levels of the sub-regions according to the second weight value and the first weight value to obtain the phase difference and the confidence level of the focus region; and
a focusing submodule, which is configured to control a motor to automatically focus according to the phase difference and the confidence level of the focus area calculated by the calculating submodule.

10. The phase-detection auto focus device of claim 8, wherein the depth-of-field determining unit comprises:
an absolute value calculating subunit, which is configured to calculate an absolute difference corresponding to the phase difference of the each sub-region according to the phase difference of the each sub-region; and a comparing subunit, which is configured to: compare the absolute difference and a preset depth of field threshold and determine whether the absolute difference is greater than the preset depth of field threshold, and in condition that at least one absolute difference is greater than the preset depth of field threshold, determine that depths of field of the plurality of sub-regions are different; and in condition that the absolute difference value is less than or equal to the preset depth threshold, determine that sub-regions with different depths of field do not exist.

11. A non-transitory storage medium, comprising stored programs which, when executed, perform the phase-detection auto focus method of claim 1.

* * * * *